May 12, 1959 G. T. BAKER 2,886,645

ELECTRICAL SIGNALLING SYSTEMS

Filed May 26, 1953 6 Sheets-Sheet 1

INVENTOR
GEORGE THOMAS BAKER

May 12, 1959 G. T. BAKER 2,886,645

ELECTRICAL SIGNALLING SYSTEMS

Filed May 26, 1953 6 Sheets-Sheet 2

INVENTOR
GEORGE THOMAS BAKER

Inventor
George Thomas Baker
by Dearne Stirling
Attorney

Inventor
George Thomas Baker
by Dennis Steining
Attorney

Inventor George Thomas Baker
by Deane Shurtleff
attorney

Inventor George Thomas Baker
by [signature]
Attorney

United States Patent Office 2,886,645

Patented May 12, 1959

2,886,645

ELECTRICAL SIGNALLING SYSTEMS

George Thomas Baker, Taplow, England, assignor to British Telecommunications Research Limited, Taplow, England Application May 26, 1953, Serial No. 357,472

Claims priority, application Great Britain May 27, 1952

6 Claims. (Cl. 179—18)

The present invention relates to electrical signalling systems, for instance telecommunication systems and is more particularly concerned with arrangements in which registering devices are employed which store information, for instance in the form of numerical digits, and subsequently in dependence on the stored information control other apparatus so as to produce suitable switching or indicating operations.

The invention moreover relates to registering devices of the high-speed type and particularly to so-called magnetic drums in which the storage of information is effected by the selective magnetisation of unit areas on a rotating drum by means of a writing head, the information being subsequently examined and possibly picked off by a reading head. It will be understood that the term "drum" is intended to include also a disc or an endless tape though these forms might not be so convenient in practice.

With equipment of this type it is generally necessary to record certain instructions in addition to the actual numerical information and often these instructions can only be written in after the receipt or initial treatment of all or particular groups of the numerical information. Nevertheless the instructions concern the subsequent treatment of the numerical information and therefore require to be made available before the numerical information comes up for review.

One possible method of overcoming this difficulty is to make use of a transfer track to which either the information or the instruction is transferred and then to combine the reading of the two tracks with the appropriate time relationship. This arrangement however involves certain complications and also the provision of additional track space and the chief object of the invention is to overcome the difficulty in a simpler and more satisfactory manner.

According to one feature of the invention in a high-speed storage device of the magnetic drum type adapted to register a succession of similar groups of data and control an operation in accordance therewith dependent on an instruction which is also recorded within the scan interval corresponding to the associated group, in order to permit an instruction recorded subsequently to a group of data to be used to control the use of these data on the same scan two reading heads are provided one of which is arranged to come into operation earlier than the other.

According to another feature of the invention in a high-speed storage device of the magnetic drum type arranged to register wanted telephone subscribers' numbers and to control the setting of automatic switches accordingly, control is effected by means of main and auxiliary reading heads associated with the same track which are effectively spaced apart a distance equal to the length of track assigned to one subscriber.

Figure 1:
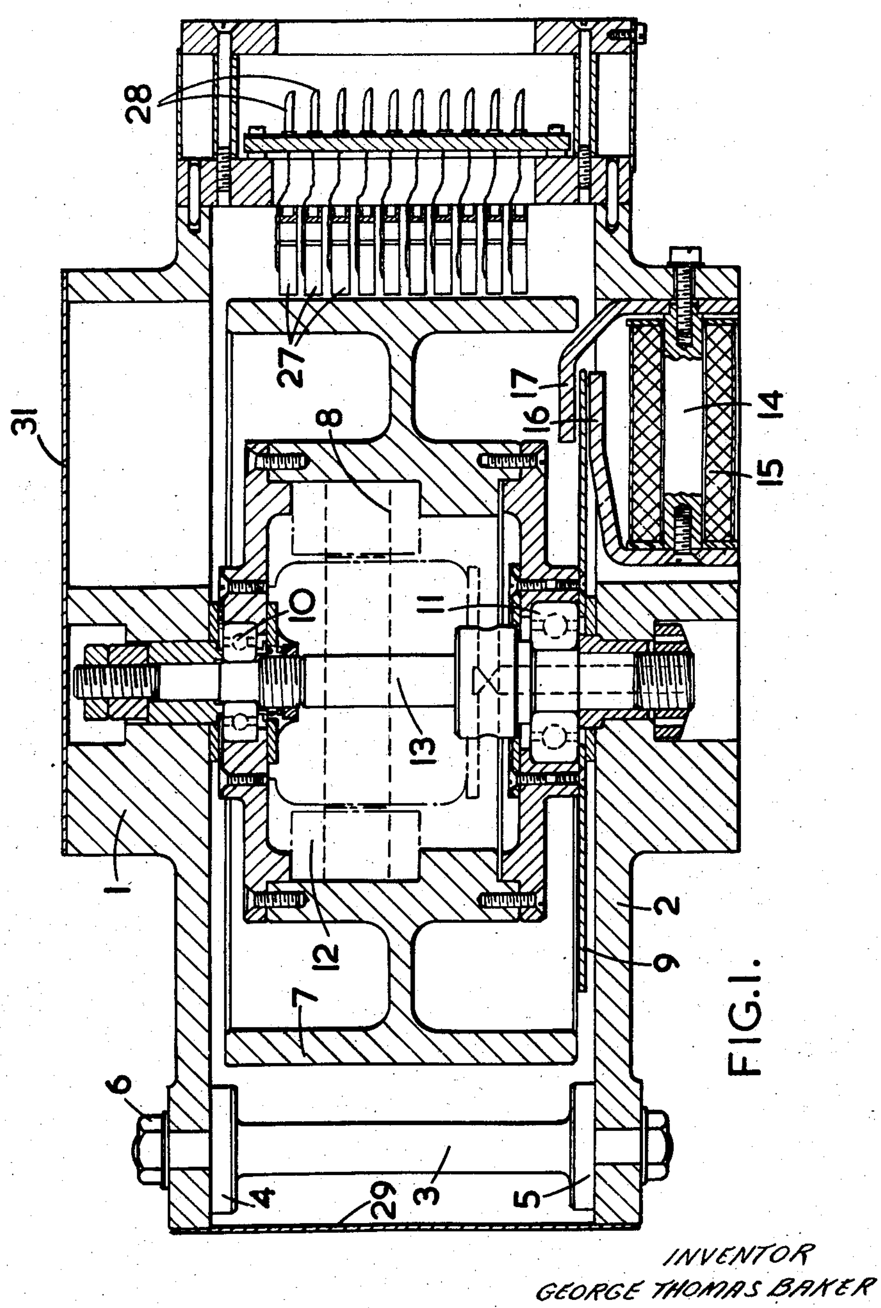
Figure 2:
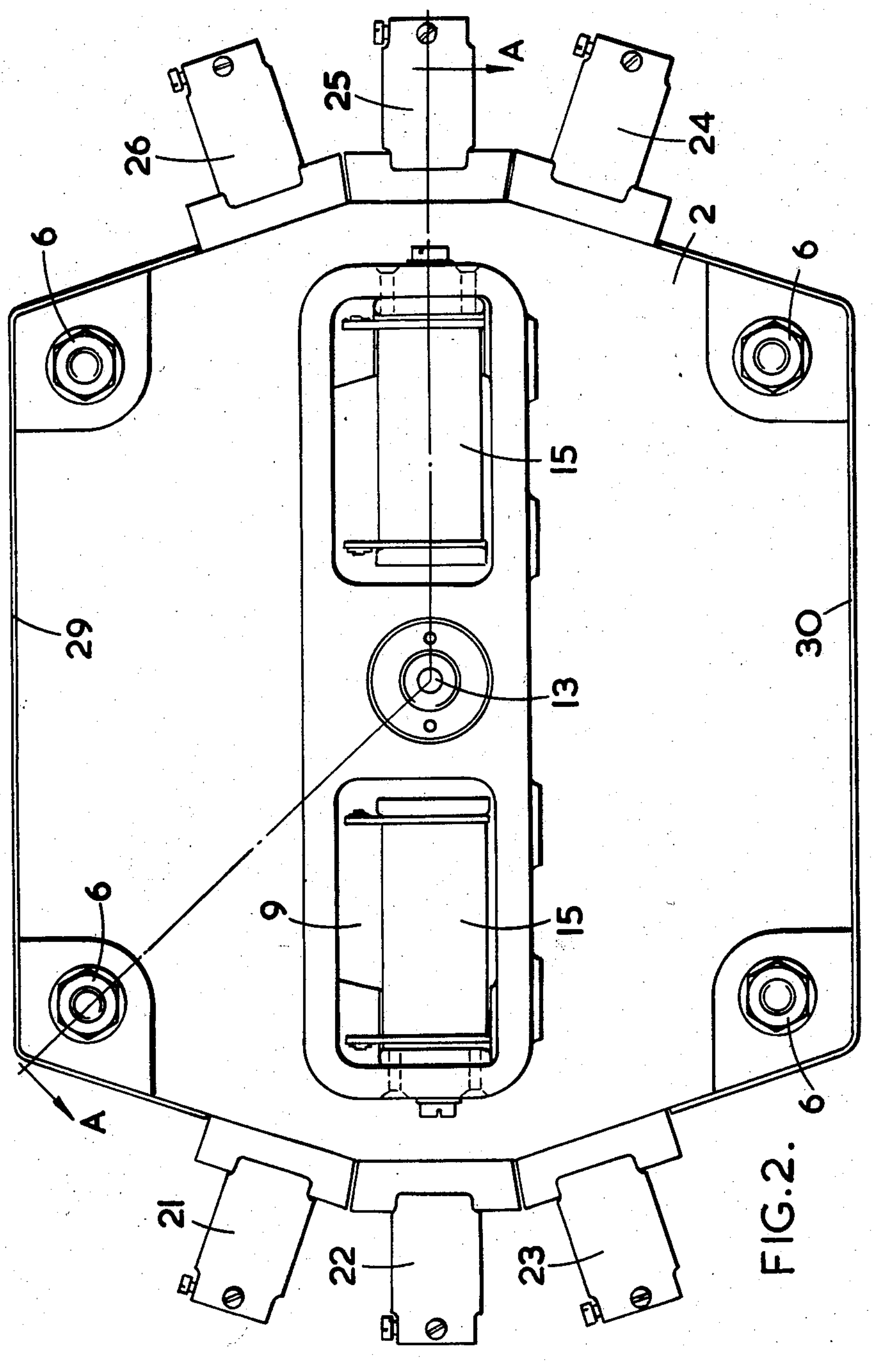
Figure 3:
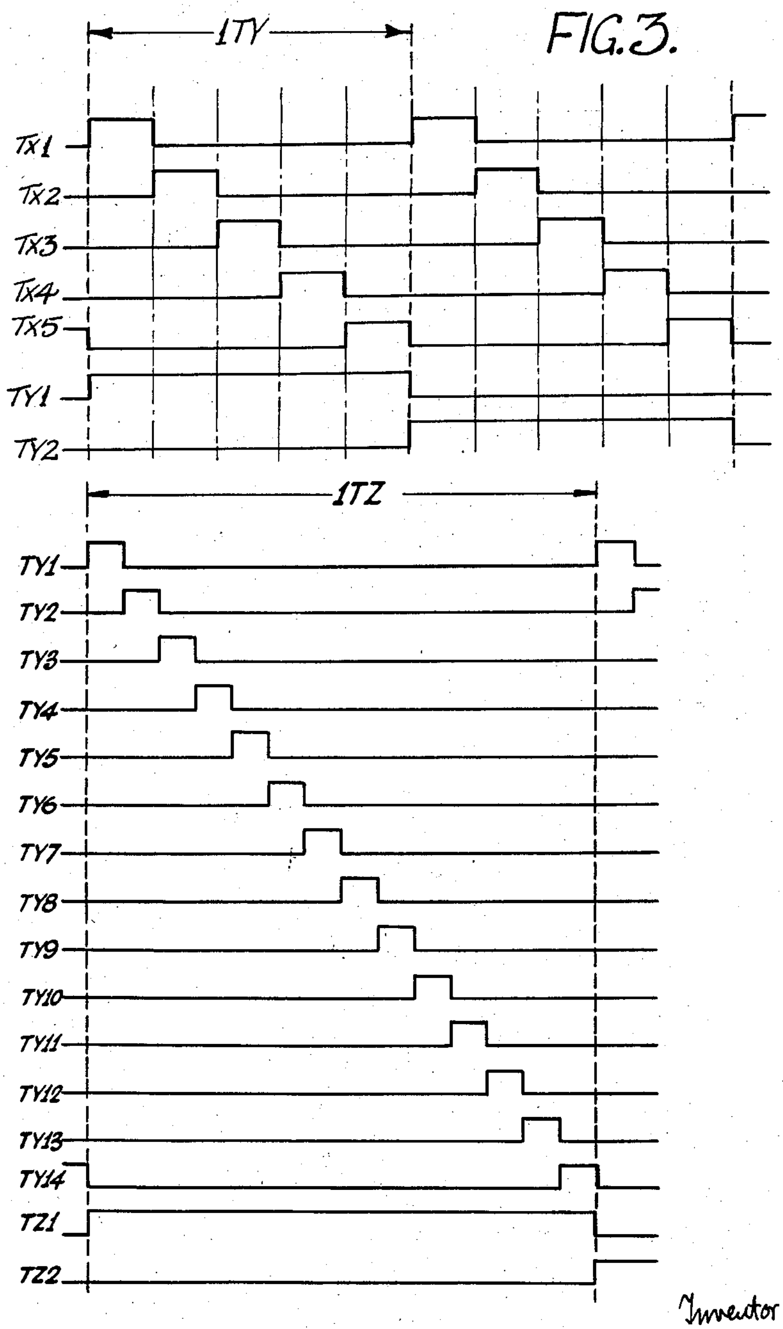
Figure 4:
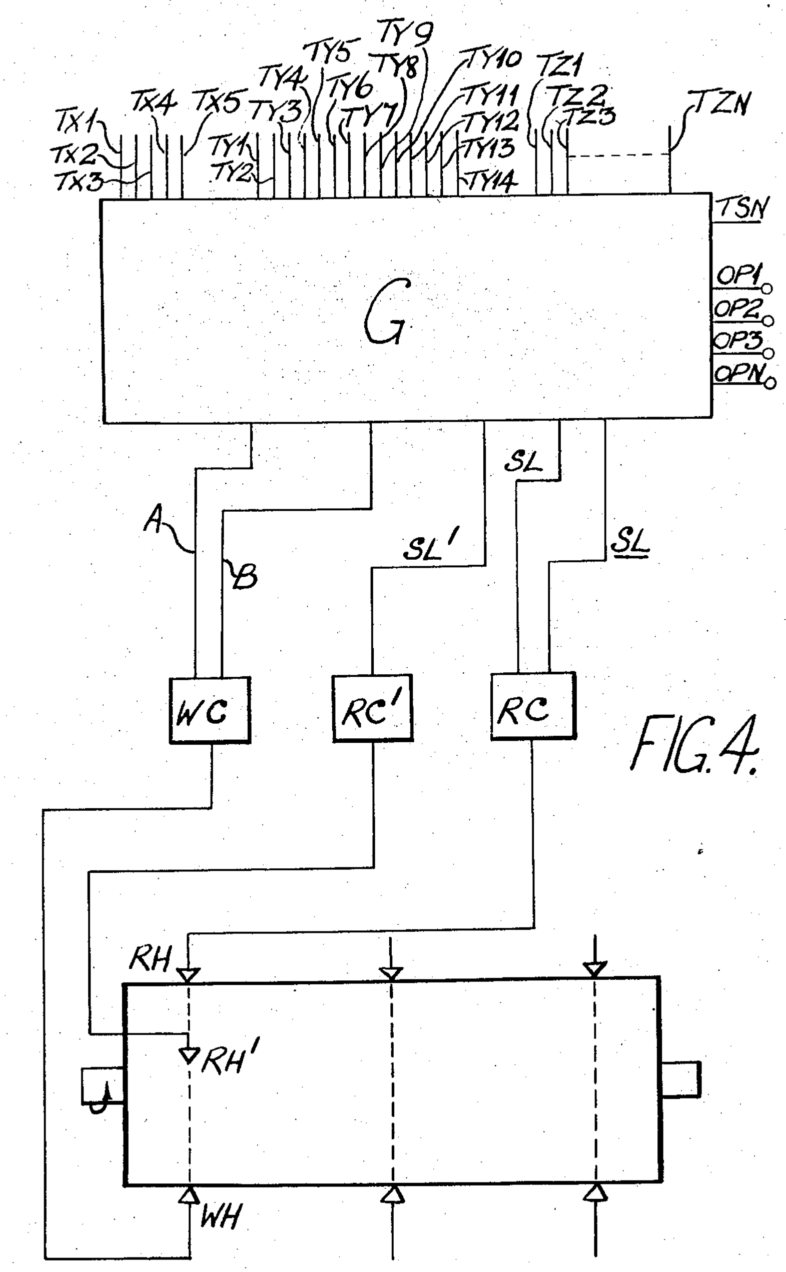
Figure 5:
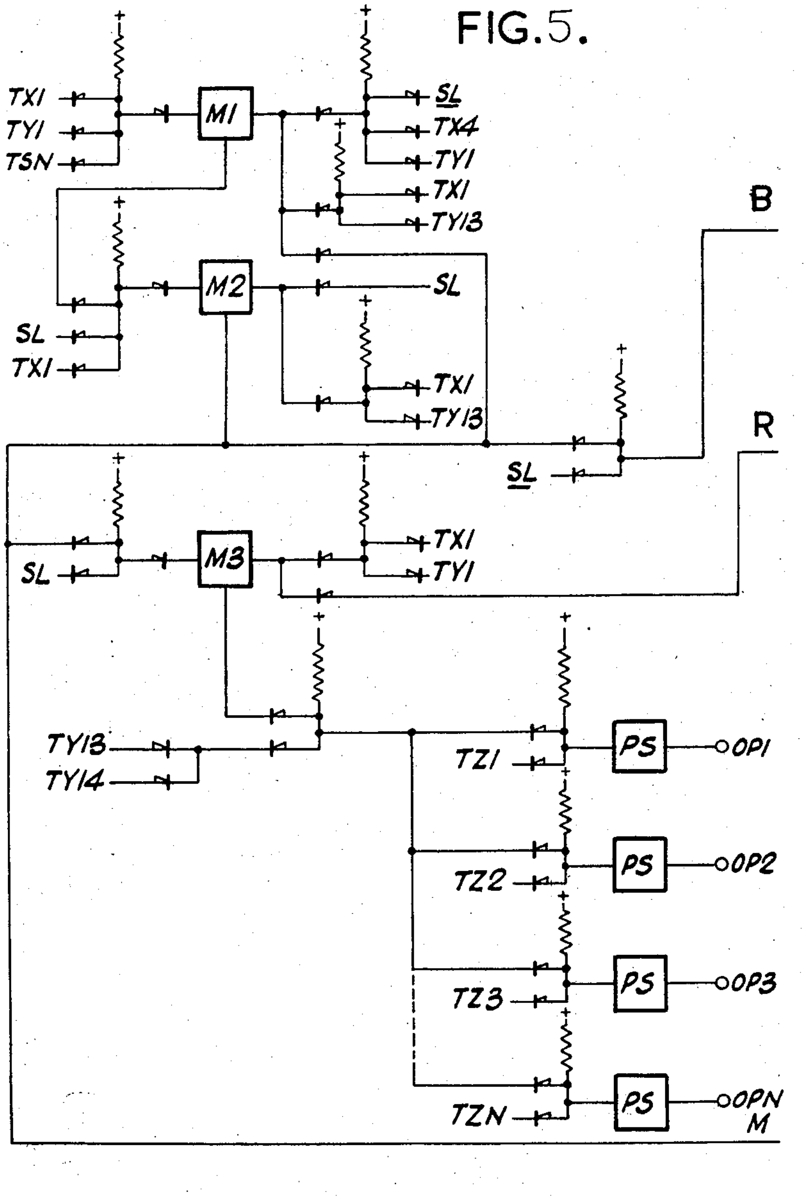
Figure 6:
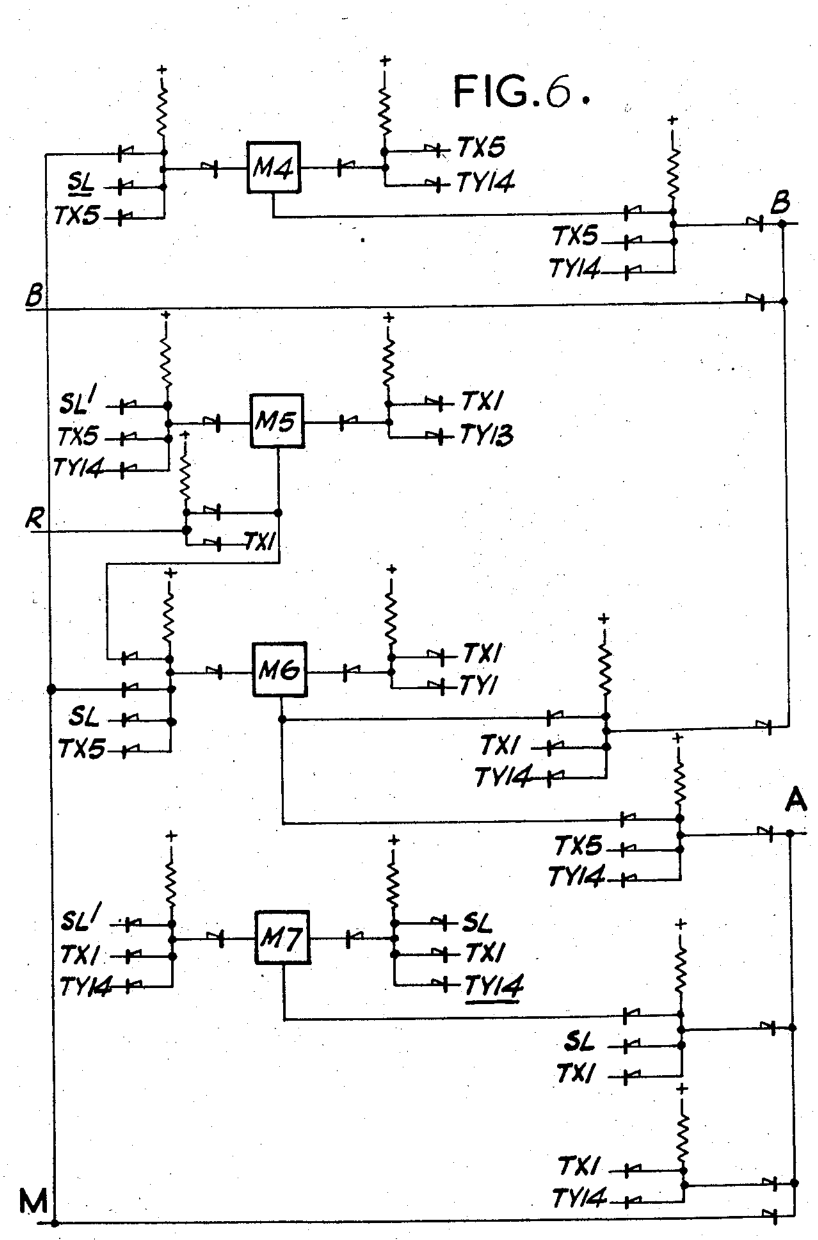

The invention will be better understood from the following description of one method of carrying it into effect which should be taken in conjunction with the accompanying drawings comprising Figs. 1 to 6. Of these drawings Figs. 1 and 2 represent respectively sectional and inverted plan views of a form of magnetic drum which may be used as the storage device, Fig. 1 being a sectional elevation on the line A—A of Fig. 2. Figure 3 shows a number of waveforms which are used to control the operation of the drum. Figure 4 is a schematic drawing of the drum and its control equipment when used in an arrangement whereby telephone subscribers' numbers recorded on the drum in binary code may be caused to control the generation of corresponding trains of impulses at a speed of 10 impulses per second for operating automatic switching or register devices. Figures 5 and 6 when placed side-by-side with Figure 5 on the left show in conventional manner how control for this purpose is effected by a number of gate circuits composed of assemblages of rectifiers and resistors.

Since the invention is not concerned with the details of construction of the drum as such, only a general description will be given of the constructional arrangements shown in Figs. 1 and 2. It will be understood that the general basis is that the drum is driven by a built-in electric motor of the induction type and the rotating unit also carries an eddy current disc which passes between the poles of two braking magnets. These magnets are energised by way of suitable control equipment so as to exert a variable braking effect and ensure that the drum runs at an accurately controlled speed. It will be understood that the physical location of the various writing and reading heads is not of fundamental importance provided their electrical relationship is adjusted by suitable switching arrangements.

In order to secure efficient utilisation of the drum the different circumferential tracks can be quite closely spaced, for instance at 1/10" centres, and it is a convenience to stagger the various reading and writing heads performing similar functions on different tracks; for instance they may be 180° apart. In a convenient mechanical construction they are located in six different radial planes as shown in the drawing. An auxiliary reading head as provided according to the invention clearly cannot be located in the same stack as its associated main reading head as the angle between them must represent the actual difference in their times of effective operation since they are operating on the same track.

Considering Figs. 1 and 2 in more detail, it will be seen that the drum assembly comprises two end plates 1 and 2 which are spaced apart by the four supporting pillars 3 provided with collars 4 and 5. The assembly can thus be held rigidly together by tightening the nuts 6 on the threaded ends of the pillars.

The rotating assembly comprises essentially the drum proper 7 having an outer magnetised surface which may be produced by electrodeposition of a suitable layer of nickel. The boss of the drum carries the squirrel-cage rotor 8 and the eddy current disc 9, and the rotating portion is mounted on the ball races 10 and 11, the lower race 11 being somewhat larger than the upper race 10. The co-operating portion of the electric drive motor is provided by the stator assembly 12 secured to the shaft 13 which is fixed to the end plates 1 and 2. The eddy current disc 9 co-operates with the braking coils of which the one shown in Fig. 1 includes the core 14, the coil 15 and polepieces 16 and 17.

The reading and writing heads, which are generally similar in mechanical construction, are arranged in six stacks 21 to 26, each stack including ten heads such as 27. This comprises essentially a support of brass or other non-magnetic material having a circular hole at the end in which is located the coil with appropriate pole-pieces which extend to the edges of the mount so as to co-operate with the drum surface. Conveniently the hole in the mount is filled with casting resin to maintain the coil in position and the production of the required air gap is effected by a grinding operation which removes unwanted portions of the mount, the casting resin and the pole pieces themselves. The electrical connections are brought out to the soldering tags 28 and the equipment is enclosed by the cover plates 29 and 30 extending in a circumferential direction and the plate 31 extending at right angles to the axis of rotation. It will be appreciated that all the heads in each stack may not always be required depending on the nature of the information which is stored in any particular track.

Referring now to Figure 3, it should be explained that the graphs there shown represent timing waveforms involving, for instance, positive-going square pulses of an amplitude of 10 volts, the time scale being horizontal. The method of use of these timing waveforms will appear from the subsequent description. As will be appreciated, the upper and lower portions of Figure 3 are not drawn to the same time scale. It will be seen that 5 TX pulses occur successively in the time of one TY pulse and also that 14 TY pulses occur successively in the time of one TZ pulse. The total number of TZ pulses might for instance be 20 corresponding to the total registration length of one track on the drum forming 20 similar registers but this number is arbitrary and depends on the speed and diameter of the drum and the amount of information which it is required to record in association with a particular controlled circuit.

The general method of operation of the drum circuits is similar to that described in greater detail in the application of George T. Baker, Serial No. 300,429, filed July 23, 1952. This shows how registrations on the drum are made on a regenerative basis and the operation may be readily followed by considering that writing is controlled by two leads denoted by A and B. If potential is connected to the A lead, the resulting marking is a 0 or blank, while if potential is connected to the B lead, the resulting marking is a 1 or dot. If potential is connected to both leads simultaneously, the effect of the B lead preponderates and a 1 is written. It will be understood that it is decided arbitrarily which particular magnetic state shall correspond to a 0 and which to a 1, but the fundamental basis is that two states of magnetisation are possible so that binary recording is achieved. As pointed out in the application previously referred to, the magnetic recording preferably involves a change from magnetisation in one direction to magnetisation in the other direction at the middle of each element or cell and the required information is stored according as the change in magnetisation is in one direction or the other. The TX pulses correspond to the time taken for a single cell to pass under a reading or writing head and it is assumed that there are 5 cells in each block corresponding to a decimal digit. The first or TX1 cell is used for marking whether that particular block is occupied by a recorded digit, while the remaining four cells in the TX2–TX5 positions record the digit in binary code. It is assumed that the system makes use of 14 digit blocks of which the 1st and 14th are used as instruction blocks while the 2nd–12th blocks may be used for the storage of digits.

Reference should now be made to Figure 4 which shows in block schematic form the general layout of the system and it will be seen how the drum MD is provided with a number of circumferential tracks, three of which are indicated. Control is exercised by a number of gate circuits collectively indicated as G and including the memory or toggle circuits M1—M7 shown with their various control circuits in Figs. 5 and 6. Each of these toggle circuits is basically of the well-known Eccles-Jordan type and details of a possible circuit arrangement are shown in application Serial No. 300,429 previously mentioned. The registration of dialled digits is assumed to be effected in binary notation in serial form in any suitable manner, for instance, as described in the application of George T. Baker, Serial No. 300,431, filed July 23, 1952.

The track on the left of the drum is provided with a reading head RH and a writing head WH which are identical and are conveniently mounted in the same plane at right angles to the axis of rotation of the drum and 180° apart. It will be understood that if there are ten or more tracks as in the construction illustrated in Figs. 1 and 2, there will be corresponding reading and writing heads provided. Clearly if full use is to be made of the storage capacity of the drum, the tracks must be located as close together as possible but it is difficult to keep the axial dimensions of a reading or writing head to the width of the associated track. Hence it may be desirable from considerations of physical spacing to stagger both reading and writing heads by arranging them in two stacks in which they are offset by half the width of the track. The circuits can readily be arranged however so that, though staggered, the heads occupy the same electrical position. The 180° angular relationship suggested above between the reading and writing heads associated with a particular track is a convenient one and means that the same stored information is recorded on each half of the circumference of the drum. Alternatively the reading and writing heads may be displaced by an angle sufficient to give adequate physical separation, say 20°, in which case the remainder of the circumference is available for storage purposes but any particular signal will appear in a different position on the drum during successive revolutions.

The reading head RH is connected to the control equipment RC which produces an output SL when the reading head encounters a 1 recorded on the drum and a reverse output SL when a 0 is encountered. The writing head WH is operated from the control equipment WC and according as potential is fed to lead A or lead B so a 0 or a 1 is written on the track. For reasons already suggested which will appear more fully as the description proceeds, it is desirable to ascertain what is written in the control block 14 and to use this information on the same scan to effect changes in the information recorded in the blocks preceding block 14. To enable this to be done conveniently, an auxiliary reading head RH' is provided and associated control equipment RC'. This head is spaced in advance of the regular head RH a distance equal to the length of storage space representing one register, which is scanned in one TZ interval. Thus, it can readily be brought about that after the head RH' has examined block 14, the head RH will immediately thereafter examine block 1 and subsequently blocks 2 and 3 and so on. The head RH' will, of course, be in a position to examine all the blocks and not only block 14, but it is only block 14 with which it is directly concerned and this is readily arranged by suitable circuitry.

Of the leads shown on the right of the rectangle G, the lead TSN carries a waveform by means of which operating potential is connected up for ⅙th of the total time for periods corresponding to the scanning time of a complete track. In other words operating potential persists on lead TSN for a period of 20 TZ intervals with the assumption previously made and is then removed for 100 TZ intervals. The terminals OP1, OP2, OP3 . . . OPN give access to a plurality of outgoing circuits, 20 with the assumptions just made, over which trains of impulses are transmitted at a speed of 10 i.p.s. in accordance with the registrations on the drum. On this basis scanning for transmission need not take place oftener than 10 times per second but the scanning speed for the registration operation will generally need to be appreciably higher and in the present example it is assumed that this takes place every 16⅔ ms., that is to say 60 times a second, in order to be sure of proper operation from subscribers' dials which may be seriously out of adjustment. This speed is six times as fast as the scanning speed for sending. This explains the need for the waveform TSN which is effective every 100 ms., that is to say, on a 1 in 6 basis compared with registration. By this means the equipment for controlling sending may be associated with six different tracks in turn.

The general principle of operation is that if a stored digit is encountered during the send scan, a pulse is initiated over the appropriate outgoing circuit and by means of a separate timing device individual to the circuit this is terminated at the appropriate instant. Thus since pulses normally have a ratio of break to make of 2 to 1, the timing device will arrange to hold the break period for 66⅔ ms. or alternatively the make period for 33⅓ ms., the remainder of the 100 ms. period then being occupied by the opposite condition. Each time such a pulse is transmitted the binary registrations is reduced by one unit.

At the end of a particular digit when the count in the store has been reduced to zero, it is necessary to time an interdigital pause and this is effected by continuing to count down a predetermined number of units while at the same time suppressing outgoing impulses. It will be appreciated that the operation of the register can be cyclic in that when it has been counted down to zero, further counting is still possible. If this is done however it is convenient to think of the starting state as 16 rather than 0 since a register involving only four binary terms will have completed a full cycle after 16 operations. Means must also be provided to distinguish between the counting down for the interdigital pause and the case where a high value digit has been registered so that counting down to 8 takes place during the sending of impulses.

Referring now to Fig. 5, a first memory circuit M1 is arranged to be operated over coincidence circuit TX1.TY1.TSN in the first position of the first instruction block during the read scan when potential is applied to TSN which receives pulses representing one sixth of the total time corresponding to the slower rate of scanning for reading. If however there is no registration in the fourth position of the first instruction block which is the marking arbitrarily chosen to indicate that sending is to take place, the coincidence circuit SL.TX4.TY1 for resetting memory circuit M1 becomes operative and this circuit is therefore reset before it has had an opportunity of influencing memory circuit M2. As long as no sending is required therefore, memory circuit M1 will be repeatedly operated and reset without producing any further effect.

Assuming however that sending is required, when the reading head next encounters a block having a busy dot in position 1 to indicate that it has a number stored therein, memory circuit M2 is operated over coincidence circuit M1, SL, TX1 and the sending and counting process now proceeds. As previously mentioned, the procedure adopted is for the binary registration to be reduced by 1 on each send scan and to bring this about the condition of all the storage areas is reversed in turn until it happens that a 1 has been changed to a 0 whereupon the desired result will have been attained. This is effected from the output of memory circuit M2 by which potential is applied by way of lead M directly to lead A by way of a buffer rectifier and also by way of a coincidence circuit involving lead SL to lead B. Consequently as long as the registrations encountered are 0's, that is to say potential is encountered on lead SL, lead B receives potential as well as lead A and therefore 1's are written in. When a unit area is reached which is in the 1 condition, no further potential can be applied to lead B since there is no potential on lead SL and the 1 is changed to 0 due to potential on lead A and the memory circuit is then reset by potential picked up from lead SL.

The output from the memory circuit M2 also resets memory circuit M1 and is further extended over a coincidence circuit involving lead SL to effect the operation of memory circuit M3. This circuit is therefore operated on each scan as long as there is any registration in any digit block for which corresponding impulses need to be generated resetting having been effected at the beginning of each scan by the coincidence circuit TX1.TY1. The output from memory circuit M3 is applied to a coincidence circuit which ensures that it is only effective during the time that blocks 13 and 14 are being scanned. The effect of this is that the commencement of the impulse takes place at a definite instant of time regardless of the particular block in which the registration is located and consistent impulses are therefore generated. This potential is applied over further coincidence circuits which ensure that, as determined by the timing pulses TZ1–TZN, it is distributed to correspond with the proper registrations which are associated with the various keysets, subscribers' lines or other signal sources. These coincidence circuits extend to pulse lengthening devices PS which may consist of single-shot relaxation circuits each embodying a cold cathode tube by means of which the very short triggering pulse supplied by memory circuit M3 is extended for a definite length of time dependent on the constants of the circuits. This time may for instance be 66⅔ ms. so that if successive triggering pulses arrive at a spacing of 100 ms., impulses of correct ratio will be obtained. These are then fed to the outputs OP1, OP2, OP3 . . . . OPN and it will of course be appreciated that trains of pulses can be generated simultaneously for all the outputs concerned though the actual instants of commencement of the pulses will be different for the different outputs.

The memory circuit M3 is reset by coincidence circuit TX1.TY1 at the beginning of the next scan over that group and the next time potential is applied to the read scan lead TSN, memory circuits M1, M2 and M3 will again be operated, the registration will be counted down one unit and a further pulse will be sent out. The process accordingly continues in the same manner until the registration has been reduced to zero, in which case there is no potential on lead SL when the registration areas of the appropriate block are next scanned and consequently the usual circuit for resetting the memory circuit M2 is not completed. What has to happen now is that an interdigital pause should be inserted and then a train of impulses should be sent out corresponding to the succeeding digit storage block having a stored registration as indicated by the presence of a busy dot in the first area. The maintenance of potential on lead M however owing to the fact that the memory circuit M2 has not been reset enables coincidence circuit M.SL.TX5 to become effective in position 5 of the block under consideration to operate memory circuit M4, Fig. 6. Memory circuit M4 then applies potential to lead B over coincidence circuit M4.TX5.TY14 which causes a so-called interdigital dot to be written in area 5 of the second instruction block 14 and the memory circuit M4 is then reset over TX5.TY14. On the next send scan, memory circuit M2 is again operated and the process which now takes place comprises counting down from 0, which in these circumstances is equivalent to 16, to 8, by which time an interdigital pause of approximately 900 ms. will have been timed. During this period it is clearly necessary to suppress the transmission of any outgoing impulses and the manner in which this is done will be apparent as the description proceeds.

It should be pointed out however that with the arrangement shown, instructions derived from what has already happened are registered in the final or second instruction block TY14 but they are required to become effective at storage blocks located ahead of this instruction block in the direction of rotation of the drum. This difficulty is overcome according to the invention by making use of an auxiliary reading head which is located one complete group in advance of the normal reading head so that the reading of the second instruction block 14 is effected immediately prior to the encountering of the first instruction block by the normal reading head. The output of this auxiliary reading head is designated SL'.

Accordingly on the next scan, coincidence circuit SL', TX5.TY14 provides that the interdigital dot shall operate memory circuit M5 and this in the first position of the appropriate digit block applies potential over M5.TX1 to lead R which therefore resets the memory circuit M3 and thus prevents triggering impulses being transmitted in the block 13 and 14 positions to any of the PS circuits to produce outgoing impulses. Accordingly the memory circuits M1 and M2 of Fig. 5 continue counting down from 16 and when this process has proceeded as far as 8, the digit registration will comprise a dot in area 5 only of the digit block in question. This means that memory circuit M2 will not be reset until position 5 and the conditions are therefore established for effecting the operation of memory circuit M6 over coincidence circuit M5.M.SL.TX5. As a result a dot which may be termed a "remove busy" dot is written in the first area of the instruction block 14 since coincidence circuit M6.TX1.TY14 applies potential to lead B. Immediately afterwards the interdigital dot written in the fifth area of this block is erased due to potential applied to lead A over M6.TX5.TY14 and memory circuit M6 is subsequently reset over TX1.TY1. On the next scan, this "remove busy" dot when picked up by the auxiliary reading head effects the operation of memory circuit M7 over SL'.TX1.TY14 as a result of which the busy dot is removed from the next digit block encountered which includes such a dot which will be the one from which the registered digit has just been transmitted. This is effected in consequence of the coincidence circuit M7.SL.TX1 applying potential to lead A. Memory circuit M7 is reset over SL.TX1.TY14 by the busy dot immediately prior to its removal so as to prevent the removal of the busy dots in subsequent blocks when a digit is registered but transmission of outgoing impulses has not yet taken place. Shortly before this, memory circuit M5 has been reset over TX1.TY13 and since the block which has just been dealt with no longer has a busy dot associated with it, the next block now controls the operation of memory circuit M2 and a corresponding train of impulse is transmitted in the manner just described.

It will be appreciated that when a digit greater than 7 is being transmitted so that a count of 8 or more appears in the digit block, the interdigital dot will not have been inserted when the count of 8 is reached. Consequently the conditions are not correct for the operation of memory circuit M5 and hence memory circuit M6 cannot be operated to insert the "remove busy" dot at this stage. Thus the busy dot remains in the block in question and counting down proceeds from 8 to zero, corresponding impulses being transmitted over the outgoing circuit.

When all the digits have been transmitted, there is no block provided with a busy dot in the first area and hence there is no potential on lead SL at the appropriate time for operating memory circuit M2. Consequently no further sending takes place and when the marking in the fourth area of the first instruction block is removed, this particular TZ group is available for the registration of a further number.

I claim:

1. In combination, a magnetic drum, means for continuously rotating said drum about its axis, a writing head, control means for causing said writing head to record a succession of items of information round a circumferential track on said drum, means for causing said writing head to record on a portion of track immediately following said information record instructions for the subsequent processing of said recorded information, a first reading head, a second reading head spaced apart from said first reading head a distance equal to the length of track assigned for the recording of said information and said instructions, and means for rendering said second reading head operative immediately prior to the encountering of said information by said first reading head so as to enable the instructions to be acted on when the associated record next passes said first reading head.

2. In combination, a magnetic drum, means for continuously rotating said drum about its axis at a substantially constant speed, means for recording the digits of a telephone subscriber's number on a circumferential track on said drum in a succession of groups of code elements, a first reading head for responding to said recorded code to bring about the transmission of corresponding trains of impulses over an outgoing circuit, means for recording instructions controlling the subsequent transmission of said recorded numbers on a section of track following that on which said digits are recorded, and a second reading head located ahead of said first reading head a distance equal to the length of track assigned for the recording of said subscriber's number and said instructions and means for rendering said second reading head operative so as to read said instructions immediately prior to the encountering of said recorded digits by said first reading head.

3. In combination, a magnetic drum, means for continuously rotating said drum about its axis at a substantially constant speed, means for recording the digits of a telephone subscriber's number on a circumferential track on said drum in a plurality of blocks one for each digit, means for recording instructions for the processing of said digit records in two further blocks one at each end of said digit blocks, a first reading head for responding to said recorded digits to bring about the transmission of corresponding trains of impulses over an outgoing circuit, and a second reading head located ahead of said first reading head a distance equal to the total length of said digit and instruction blocks and means for rendering said second reading head operative so as to read said instructions recorded in said second instruction block immediately prior to the encountering of said first instruction block by said first reading head.

4. In a magnetic drum recorder as claimed in claim 3, means for making a record in said second instruction block to indicate that all the impulses representing a digit recorded in one digit block have been transmitted, and means controlled by said second reading head responsive to said record in said second instruction block for timing an interdigital pause.

5. In a magnetic drum recorder as claimed in claim 4, means responsive to the completion of the timing of said interdigital pause for making a characteristic record in said second instruction block, means controlled by said second reading head responsive to said record for marking the digit block succeeding that corresponding to the train of impulses which has just been transmitted.

6. In combination, a magnetic drum, means for continuously rotating said drum about its axis, a writing head, control means for causing said writing head to record a succession of items of information on a circumferential track on said drum, a first reading head, a second reading head spaced apart from said first reading head a distance equal to the length of track assigned for the recording of said succession of items of information, and means for rendering said second reading head operative to read said succession of items of information immediately prior to the reading thereof by said first reading head.

References Cited in the file of this patent

UNITED STATES PATENTS

| | | |
|---|---|---|
| 2,533,326 | Putt | Dec. 12, 1950 |
| 2,614,169 | Cohen | Oct. 14, 1952 |
| 2,615,971 | Malthaner | Oct. 28, 1952 |
| 2,770,797 | Hamilton et al. | Nov. 13, 1956 |